United States Patent [19]
Taketani et al.

[11] Patent Number: 6,036,734
[45] Date of Patent: Mar. 14, 2000

[54] FORMING SOLID ELECTROLYTE CAPACITOR WITH APPARATUS THAT VIBRATES CAPACITOR ELEMENT WHILE COATING WITH SILVER PASTE

[75] Inventors: Yutaka Taketani, Daito; Kakusyo Yoshida, Osaka; Hidenori Kamigawa, Higashiosaka; Yasuhiro Kishimoto, Suita; Youichi Kojima; Takeshi Takamatsu, both of Daito; Hiroshi Yakui, Yamatotakada, all of Japan

[73] Assignees: Sanyo Electric Co., Ltd.; Sanyo Electronic Components Co., Ltd., both of Osaka, Japan

[21] Appl. No.: 09/168,383

[22] Filed: Oct. 8, 1998

[30] Foreign Application Priority Data

Oct. 14, 1997 [JP] Japan .................................. 9-280152
Mar. 27, 1998 [JP] Japan .................................. 10-080746

[51] Int. Cl.$^7$ ...................................................... B21F 41/00
[52] U.S. Cl. ............................ 29/25.03; 361/523; 361/525
[58] Field of Search ........................... 29/25.03; 252/62.2; 361/523, 525, 526; 438/238

[56] References Cited

U.S. PATENT DOCUMENTS 4,251,275  2/1981  Deffeyes et al. ........................ 106/1.14
4,642,876  2/1987  Murray et al. ............................. 29/570

FOREIGN PATENT DOCUMENTS 02303016A  12/1990  Japan .

*Primary Examiner*—Charles Bowers
*Assistant Examiner*—William M. Brewster
*Attorney, Agent, or Firm*—Armstrong, Westerman, Hattori, McLeland & Naughton

[57] ABSTRACT

This invention relates to solid electrolyte capacitors and is intended to decrease the contact resistance between the body of the capacitor and lead frames and the internal resistance of these components The invention provides a process for producing a solid electrolyte capacitor by forming a dielectric oxide film on an anode body of valve metal, forming a cathode layer of solid conductive substance on the oxide film to prepare a capacitor element, coating the cathode layer of the capacitor element with a carbon layer, coating the carbon layer with a silver paste layer to prepare a capacitor body, and bonding a lead frame to the silver paste layer of the capacitor body with a silver adhesive. While the capacitor element coated with the carbon layer and a silver paste are being vibrated relative to each other, the capacitor element is dipped in the silver paste and withdrawn therefrom in the direction of the vibration, whereby the carbon layer is coated with the silver paste layer. The surface of the lead frame is partly or entirely formed with a high conductive layer of a material having a higher electric conductivity than the substrate of the lead frame, the high conductive layer extending from a connection to the capacitor body to a connection for an external circuit.

5 Claims, 4 Drawing Sheets

FORMING SOLID ELECTROLYTE CAPACITOR WITH APPARATUS THAT VIBRATES CAPACITOR ELEMENT WHILE COATING WITH SILVER PASTE

FIELD OF THE INVENTION

The present invention relates to chiplike solid electrolyte capacitors comprising a cathode layer of electrically conductive solid substance, a process for producing such capacitors and an apparatus for use in practicing the process. More particularly, the invention relates to the structure of members for electrically connecting a capacitor element to external circuits which structure assures reduced resistance without entailing an increase in size, and to a process and apparatus for producing such capacitors.

BACKGROUND OF THE INVENTION

Solid electrolytic capacitors comprise an anode body of a valve metal such as Al (aluminum) or Ta (tantalum), a dielectric oxide film formed on the anode body by an electrolytic oxidation treatment, and a cathode layer formed by depositing $MnO_2$ (manganese dioxide), conductive organic compound or like solid conductive substance formed on the oxide film in intimate contact therewith. The term "valve metal" as used herein refers to a metal which forms a highly compacted durable dielectric oxide film when subjected to an electrolytic oxidation treatment. Such metals include Ti (titanium) and Nb (niobium) in addition to Al and Ta. Since the dielectric oxide film has a very small thickness, it is possible to prepare electrolytic capacitors having a smaller size and a greater capacity than other capacitors such as paper capacitors and film capacitors.

With reference to FIG. 1, a solid electrolyte capacitor 1 in the form of a chip is prepared by attaching an anode lead wire 21 to an anode body 2 of valve metal, forming a dielectric oxide film 20 on the surface of the anode body 2 by an electrolytic oxidation treatment and depositing a solid conductive substance on the oxide film 20 in intimate contact therewith to form a cathode layer 3, whereby a capacitor element 11 is obtained. Next, a capacitor body 10 is prepared by coating the cathode layer 3 of the capacitor element with a carbon layer 4, and coating the carbon layer 4 with a silver paste layer 5. As shown in FIG. 2, a lead frame 6 is subsequently bonded to the silver paste layer 5 with a silver adhesive 52, and a lead frame 60 is joined to the anode lead wire 21 as by welding. As shown in FIG. 3, the capacitor body 10 and portions of the lead frames 6, 60 are encapsulated in a resin as by injection molding to form a package 7, followed by aging. The solid electrolyte capacitor 1 is thus completed.

As compared with other types of capacitors such as ceramic capacitors, electrolyte capacitors have a higher ESR (equivalent series resistance), which it has been desired to improve. The ESR of the electrolyte capacitor is the sum mainly of the internal resistance of the cathode layer 3, internal resistances of the lead frames 6, 60, contact resistance between the capacitor body 10 and the lead frames 6, 60 and the contact resistance between an external circuit and the lead frames 6, 60. It has heretofore been required to reduce the internal resistance of the cathode layer 3 since this resistance is exceedingly greater than the other resistances.

Recently use of a conductive organic compound such as polypyrrole, polyaniline or TCNQ (7,7,8,8-tetracyanoquinodimethane) complex salt for the cathode layer 3 has remarkably reduced the internal resistance of the cathode layer 3. To reduce the ESR of solid electrolyte capacitors, it is therefore required to lower the internal resistances of the lead frames 6, 60 and the above-mentioned contact resistances in addition to the internal resistance of the cathode layer 3. Of these, the resistances relating to the present invention will be described, i.e., the contact resistance between the capacitor body 10 and the lead frames 6, 60, and the internal resistances of the lead frames 6, 60.

a. Contact Resistance between Capacitor Body and Lead Frames

The present applicant has conducted various tests and found that the contact resistance between the capacitor body and the lead frames 6, 60 is attributable mainly to the contact resistance between the silver paste layer 5 of the capacitor body and the silver adhesive 52, and that this resistance is dependent on the viscosity of the silver paste.

The silver paste contains silver, a binder and a solvent (volatile component) for dissolving the binder therein. The binder is a resin such as epoxy resin. The silver paste layer 5 is formed on the carbon layer 4 usually by dipping the capacitor element 11 coated with the carbon layer 4.

When low in viscosity, the silver paste contains a high proportion of solvent, readily permitting separation between the silver and the binder. When the silver paste of low viscosity is used for forming the silver paste layer 5, therefore, the silver paste becomes surfaced with the binder which is the resin component, increasing the contact resistance between the silver paste layer 5 and the silver adhesive 52.

When a silver paste of high viscosity is used for forming the silver paste layer 5, the contact resistance between the silver paste layer 5 and the silver adhesive 52 becomes small. However, if applied by dipping in this case, the silver paste adheres to the carbon layer 4 to an increased thickness, increasing the size of the capacitor body 10 and affording a solid electrolyte capacitor 1 of increased size. Although the silver paste of high viscosity is applicable to the carbon layer 4 in a small thickness by brush coating, this method is not practically useful in view of uneven application and productivity.

b. Internal Resistance of Lead Frames

A nickel-iron alloy having a nickel content of about 42% (hereinafter referred to as the "42-alloy") is generally used for the lead frames 6, 60 because of good electric conductivity, high strength to support the capacitor body 10 and corrosion resistance.

Since the 42-alloy is lower than gold or copper in conductivity, lead frames made of gold or copper are smaller in internal resistance than those made of the 42-alloy. However, lead frames made of gold or copper which is lower than the 42-alloy in strength need to have a greater thickness than those prepared from the 42-alloy so as to retain strength to support the capacitor. This renders the solid electrolyte capacitor 1 large-sized.

A first object of the present invention is to provide a process and apparatus for producing a solid electrolyte capacitor wherein the contact resistance between the capacitor body 10 and the lead frames 6, 60 is decreased without increasing the capacitor in size.

A second object of the invention is to provide a solid electrolyte capacitor wherein the lead frames 6, 60 are diminished in internal resistance without making the capacitor large-sized.

SUMMARY OF THE INVENTION

To fulfill the above object, the present invention provides a process for producing a solid electrolyte capacitor by forming a dielectric oxide film on an anode body of valve metal, forming a cathode layer of solid conductive substance on the oxide film to prepare a capacitor element, coating the cathode layer of the capacitor element with a carbon layer, coating the carbon layer with a silver paste layer to prepare a capacitor body, and bonding a lead frame to the silver paste layer of the capacitor body with a silver adhesive, the process being characterized in that while the capacitor element coated with the carbon layer and a silver paste are being vibrated relative to each other, the capacitor element is dipped in the silver paste and withdrawn therefrom in the direction of the vibration, whereby the carbon layer is coated with the silver paste layer.

Preferably, the silver paste has a viscosity of 50 to 300 poises, the amplitude of the vibration is 0.2 to 2 times the length of the capacitor element in the direction of the vibration, and the frequency of the vibration is 20 to 100 Hz (hertz).

Further preferably, the surface of the lead frame to be used is partly or entirely formed with a high conductive layer of a material having a higher electric conductivity than the substrate of the lead frame, the high conductive layer extending from a connection on the capacitor body to a connection for an external circuit.

The present invention also provides an apparatus for coating a capacitor element with a silver paste, the apparatus comprising a container for containing the silver paste, means for holding the capacitor element, and means for vibrating at least one of the container and the holding means upward and downward. The capacitor element is moved downward into the silver paste in the container and then upwardly moved out of the container by the holding means.

Preferably with this apparatus, the amplitude of the vibration by the vibrating means is 0.2 to 2 times the length, in the upward or downward direction, of the capacitor element to be dipped, and the frequency of the vibration by the vibrating means is 20 to 100 Hz.

The invention also provides a solid electrolyte capacitor comprising a capacitor body having an anode body of valve metal, a dielectric oxide film formed on the anode body and a cathode layer of solid conductive substance formed on the oxide film; and two lead frames supporting the capacitor body for electrically connecting the anode body and the cathode layer of the capacitor body to circuits outside the capacitor body, the solid electrolyte capacitor being characterized in that a surface of at least one of the lead frames is partly or entirely formed with a high conductive layer of a material having a higher electric conductivity than a substrate of the lead frame, the high conductive layer extending from a connection on the capacitor body to a connection for the circuit.

Preferably, the high conductive layer is made of copper.

A nickel layer can be formed on the surface of the high conductive layer, and a palladium layer on the surface of the nickel layer. A layer of gold can be formed further on the surface of the palladium layer.

With the process and apparatus for producing solid electrolyte capacitors according to the invention, the silver paste and the capacitor element are vibrated relative to each other, so that the silver paste exhibits an actually decreased viscosity in the vicinity of the surface of the capacitor element. Consequently, the silver paste, even if having a high viscosity, is applicable to the capacitor element in a small thickness, eliminating the likelihood of producing a solid electrolyte capacitor of increased size. The silver paste layer formed can be of a high viscosity to diminish the contact resistance between the silver paste layer and the lead frame.

Solid electrolyte capacitors are available with high productivity because the silver paste is applicable to the capacitor element by dip coating.

With the solid electrolyte capacitor of the present invention, the strength of the lead frame is dependent on the substrate thereof, while the electric resistance of the lead frame depends on the high conductive layer because the current through the lead frame flows predominantly through this layer. Accordingly, the substrate or base material permits the lead frame to retain a strength comparable to that of the conventional frame, eliminating the likelihood of making the capacitor large-sized. Since the high conductive layer lowers the electric resistance of the lead frame to a level lower than conventionally, the lead frame can be diminished in internal resistance.

DETAILED DESCRIPTION OF THE INVENTION

Embodiments of the present invention will be described below.

1. Embodiment of Production Process

Figure 1:
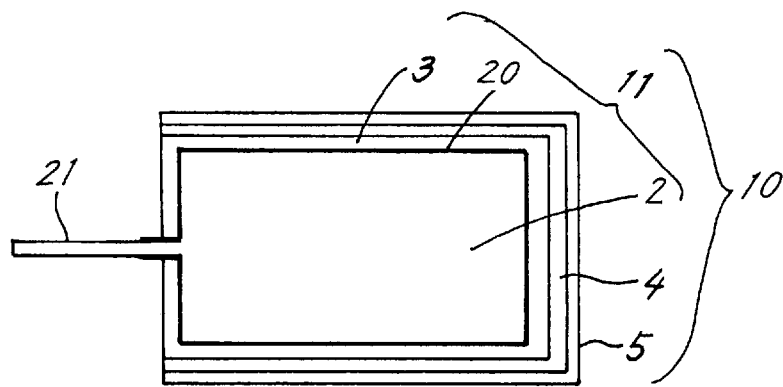
FIG. 1 is a sectional view of a capacitor body before lead frames are attached thereto.
Figure 2:
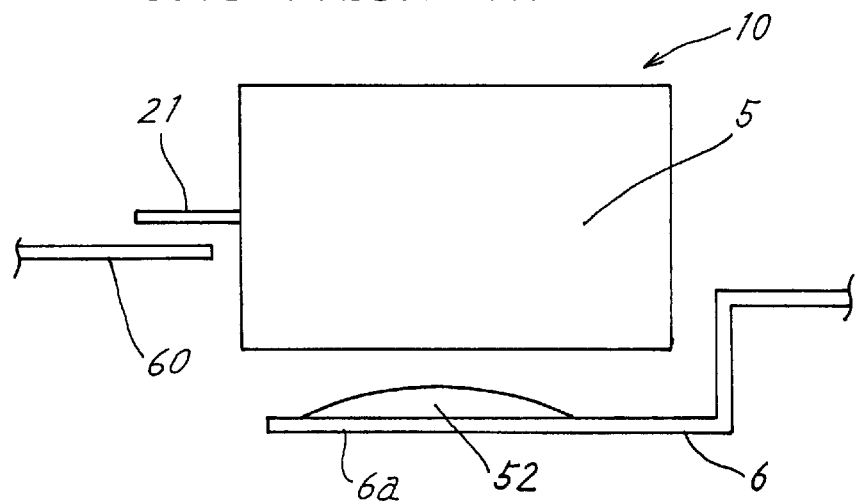
FIG. 2 is a diagram for illustrating how to attach the lead frames.
Figure 3:
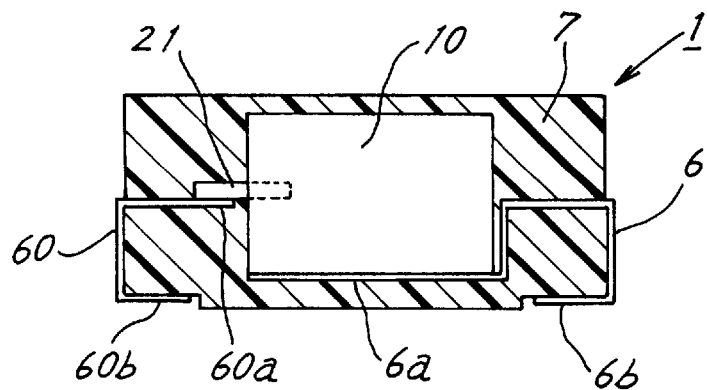
FIG. 3 is a sectional view of a completed solid electrolyte capacitor.

With reference to FIG. 1, a solid electrolyte capacitor 1 in the form of a chip and embodying the invention is produced by attaching an anode lead wire 21 to an anode body 2 made of a valve metal, such as Ta, Al or Nb, forming a dielectric oxide film 20 on the surface of the anode body 2 by an electrolytic oxidation treatment and forming a cathode layer 3 on the oxide film 20 with use of $MnO_2$, a conductive organic compound or like solid conductive substance, whereby a capacitor element 11 is obtained. Next, a capacitor body 10 is prepared by coating the cathode layer 3 of the capacitor element with a carbon layer 4, and coating the carbon layer 4 with a silver paste layer 5. As shown in FIG. 2, a lead frame 6 is subsequently bonded to the silver paste layer 5 with a silver adhesive 52, and a lead frame 60 is joined to the anode lead wire 21 as by welding. As shown in FIG. 3, the capacitor body 10 and portions of the lead frames 6, 60 are encapsulated in a resin as by injection molding to form a package 7, and the other portions of the lead frames 6, 60 exposed from the package 7 are bent along the package 7, followed by aging. The chiplike solid electrolyte capacitor 1 is thus completed.

In Example and Comparative Example to follow, a sintered body of Ta is used as the anode body 2, and polypyrrole as the solid conductive substance for forming the cathode layer 3.

The present invention is characterized by the step of coating the carbon layer with the silver paste, and by the structure of the lead frames. The other steps are the same as in the prior art and therefore will not be described in detail.

2. Embodiment of Apparatus

Figure 4:
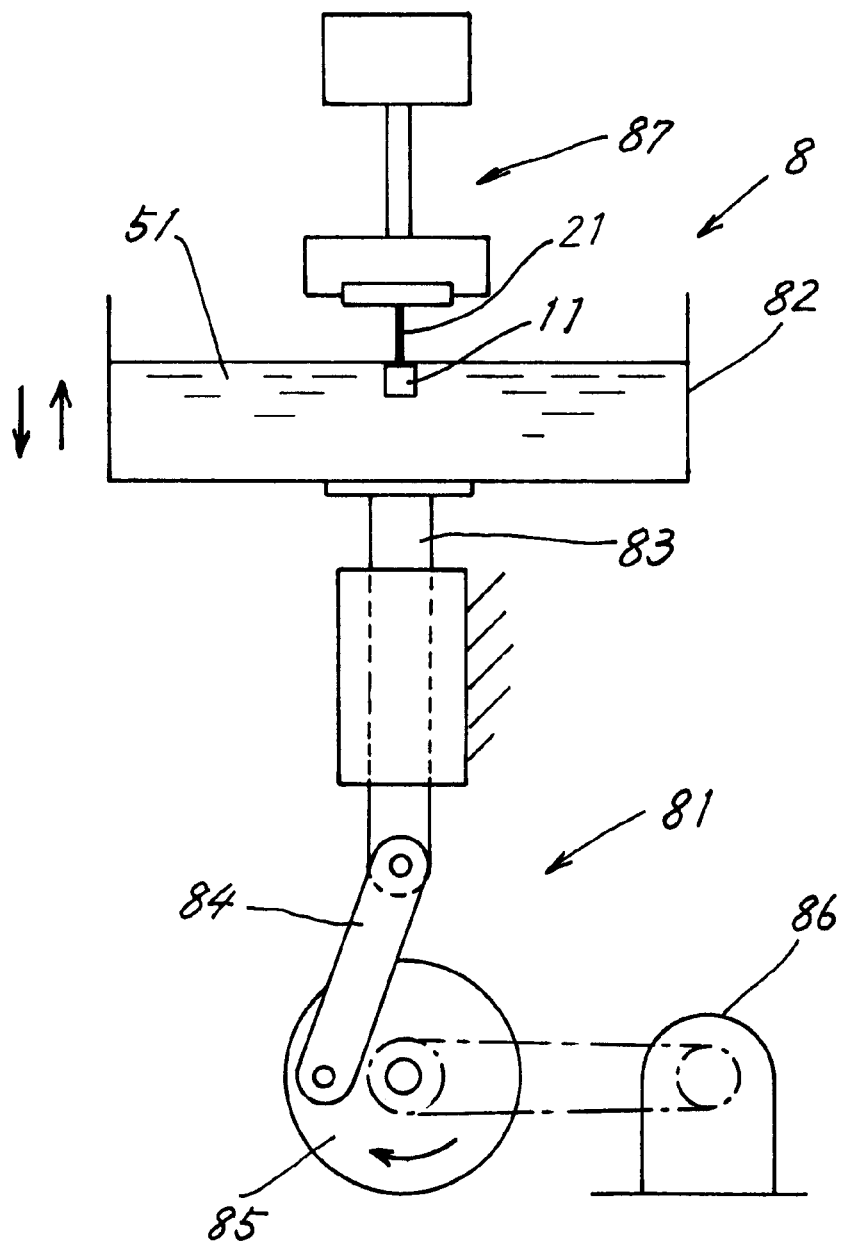
FIG. 4 is a diagram for illustrating a silver paste coating apparatus embodying the invention.

FIG. 4 shows a coating apparatus 8 for applying a silver paste 51 to the capacitor element 11 coated with a carbon layer 4. The coating apparatus 8 is coupled to a vibrating device 81 and comprises a container 82 opened at its upper side for containing the silver paste 51, and a jig 87 for holding the capacitor element 11 and dipping the element in the silver paste 51 in the container 82.

The vibrating device 81 comprises a lift shaft 83 extending downward from the bottom of the container 82 and pivotably connected by a link 84 to a rotary plate 85 eccentrically thereof, and a motor 86 coupled to the rotary plate 85. Alternatively, the vibrating device may be of the electromagnetic type.

The jig 87 is movable up and down and carries the capacitor element 11 with the outer end of the anode lead wire 21 positioned up and held to the jig 87.

The silver paste 51 is placed into the container 82 of the coating apparatus 8. The silver paste 51 to be used has a high viscosity of 50 to 300 poises. With the container 82, i.e., the silver paste 51, vibrated upward and downward by the vibrating device 81, the capacitor element 11 attached to the jig 87 is then lowered by the jig 87 so as to dip the element to the base end of the anode lead wire 21. The capacitor element 11 is thereafter withdrawn vertically upward by the jig 87 along the direction of vibration of the silver paste 51.

Example and Comparative Example are given below wherein capacitor elements 11 coated with a carbon layer 4 were each coated with a silver paste layer 5 by the coating apparatus 8.

a. Example

With this example, the silver paste 51 placed in the container 82 comprised an epoxy resin as a binder and n-butylcarbitol as a solvent, had a viscosity of 200 poises and a silver content of 82 wt % (weight percentage), and contained 91 wt % of nonvolatiles (silver, binder, etc.) The container 82 was given a vibration frequency of 30 Hz and an amplitude of 1.5 mm by the vibrating device 81.

The silver paste 51 described and used was found to be the same as the silver adhesive 52 for bonding the lead frame 6 to the capacitor body 10. The silver paste to be used may be made different from the silver adhesive 52 by being adjusted to a viscosity within the range of 50 to 300 poises and ensuring ease of application.

Capacitor elements 11 coated with the carbon layer 4 were attached to the jig 87, dipped in the silver paste 51 in the container 82 under the condition described and immediately withdrawn upward along the direction of vibration.

The silver paste layers 5 thus coating the carbon layer 4 had an average thickness of about 40 μm which was within the thickness range (40 to 200 μm) desirable for the silver paste layer 5. The capacitor bodies 10 formed with the silver paste layer 5 were 20 to 35 mΩ (milliohms) in ESR, and the ESR values resulting from the bonding of lead frames 6, 60 were 25 to 50 mΩ.

It is required that the completed product shown in FIG. 3 be up to 80 mΩ in ESR. About 90% of the solid electrolyte capacitors prepared in this example fulfilled this requirement.

b. Comparative Example

In comparison with the above example, a silver paste 51 of low viscosity was placed into the container 82, and capacitor elements 11 coated with a carbon layer 4 were attached to the jig 87, dipped in the silver paste 51 in the container 82 held at rest, and immediately withdrawn from the container upward. This step is the same as in the conventional process. The silver paste 51 in the container 82 comprised an epoxy resin as a binder and n-butylcarbitol as a solvent and had a viscosity of 10 poises, a silver content of 65 wt % and a nonvolatile content of 72 wt %.

About 30% of the solid electrolyte capacitors prepared in this comparative example fulfilled the above requirement (up to 80 mΩ in ESR)

With Example, the silver paste 51 in the container 82 is vibrating up and down relative to the capacitor element 11 when forming the silver paste layer 5, therefore exhibiting an actually decreased viscosity in the vicinity of the surface of the capacitor element 11. Consequently, the silver paste 51 of high viscosity is applicable to the capacitor element 11 in a small thickness, eliminating the likelihood of making the solid electrolyte capacitor 1 large-sized. The silver paste layer 5 formed further has a high viscosity to diminish the contact resistance between the silver paste layer 5 and the lead frame 6, consequently reducing the ESR of the solid electrolyte capacitor 1 and making it possible to produce solid electrolyte capacitors 1 meeting the requirement in a high yield. The application of the silver paste 51 to the capacitor element 11 by dip coating leads to high productivity.

c. Experimental Results

Experiments were conducted using silver pastes 51 of varying viscosities and altering the amplitude and vibration frequency of the container 82 to obtain ESR values and check the average thickness of silver paste layers 5. Tables 1 to 3 given below show the results.

TABLE 1

Relationship between silver paste viscosity and ESR

| Viscosity (poises) | ESR (mΩ) before bonding | ESR (mΩ) after bonding | ΔESR (mΩ) |
|---|---|---|---|
| 10 | 20–35 | 50–85 | 30–50 |
| 50 | 20–35 | 30–60 | 10–25 |
| 80 | 20–35 | 25–50 | 5–15 |
| 200 | 20–35 | 25–50 | 5–15 |
| 300 | 20–40 | 25–55 | 5–15 |

Note:
1) ΔESR = (ESR after bonding) − (ESR before bonding)
2) Experiment was conducted with the amplitude fixed at 1.5 mm and the vibration frequency fixed at 30 Hz.

TABLE 2

Relationship between amplitude and average thickness

| Amplitude (mm) | Average thickness (μm) |
|---|---|
| 0.6 | About 100 |
| 1.0 | About 60 |
| 1.5 | About 40 |
| 2.0 | About 40 |
| 2.5 | About 40 |
| 3.0 | About 40 |
| 6.0 | About 40 |

Note:
Experiment was conducted with the viscosity fixed at 200 poises and the vibration frequency fixed at 30 Hz.

TABLE 3

Relationship between frequency and average thickness

| Frequency (Hz) | Average thickness ($\mu$m) |
| --- | --- |
| 10 | About 300 |
| 20 | About 100 |
| 30 | About 50 |
| 40 | About 40 |
| 50 | About 50 |
| 100 | About 200 |
| 200 | About 400 |

Note:
Experiment was conducted with the viscosity fixed at 200 poises and the amplitude fixed at 1.5 mm.

In Table 1, the term "ESR before bonding" refers to the ESR between the silver paste layer 5 and the anode lead wire 21 before the lead frame 6 is bonded to the silver paste layer 5 of the capacitor body 10, and the term "ESR after bonding" refers to the ESR between the bonded portion 6a of the lead frame 6 and the anode lead wire 21 after the lead frame has been bonded to the silver paste layer 5.

With reference to Table 1, the ESR after bonding was low if the silver paste 51 was 50 to 300 poises in viscosity. At least 80% of the solid electrolyte capacitors 1 then completed fulfilled the foregoing requirement.

Table 2 shows that when the amplitude of the container 82 was 0.6 to 6 mm, the thickness of the silver paste layer 5 was restricted to the preferred range (40 to 200 $\mu$m). It is thought that this range of amplitudes corresponds to the length of the capacitor element 11 in the direction of vibration (upward or downward direction in Example). Since the capacitor elements 11 used for this experiment have a length of about 3.0 mm in the upward or downward direction, the above amplitude range corresponds to 0.2 to 2 times the length of the capacitor elements 11 in the direction of vibration.

Table 2 indicates that even if the amplitude of the container 82 is increased beyond a certain value, the effect achieved remains unaltered. If the amplitude is excessively great, the container 82 requires a great depth to necessitate a correspondingly increased amount of silver paste 51, hence poor economy. Increases in amplitude further increase the power consumption of the vibrating device and result in an economical disadvantage. Accordingly it is desirable that the amplitude of vibration of the container 82 be 0.2 to 2 times the length of the capacitor element 11 in the direction of vibration.

Table 3 shows that if the vibration frequency of the container 82 is 20 to 100 Hz, the thickness of the silver paste layer 5 is within the preferred range (40 to 200 $\mu$m)

In practicing the present invention, the capacitor element 11, while being vibrated, may be withdrawn from the container containing the silver paste 51 in the direction of vibration, with the container held at rest.

3. Embodiment of Lead Frames

Figure 5:
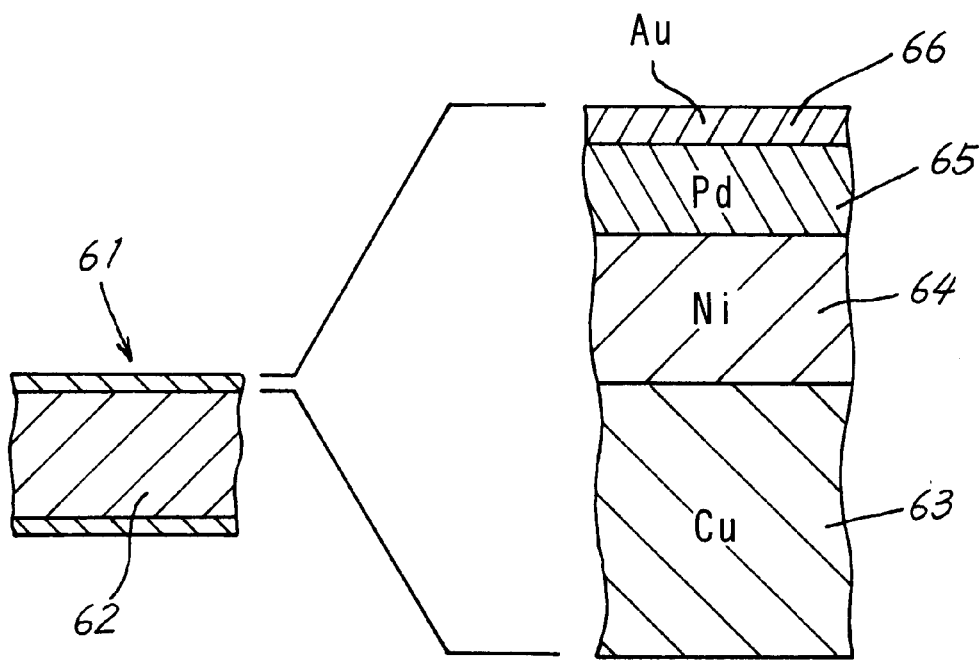
FIG. 5 is a fragmentary view in section showing a metal plate useful for the lead frames of the invention.
Figure 6:
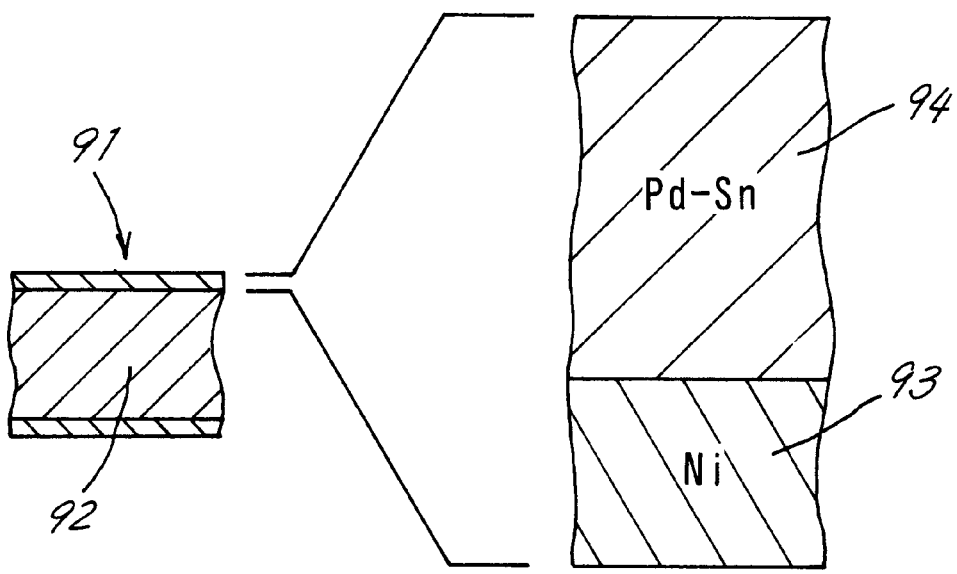
FIG. 6 is a fragmentary view in section showing a metal plate for preparing conventional lead frames.

FIG. 5 is a sectional view showing the structure of a metal plate 61 useful for the lead frames 6, 60 of the chiplike solid electrolyte capacitor 1. FIG. 6 is a sectional view corresponding to FIG. 5 and showing the structure of a conventional metal plate 91. The lead frames are prepared from the metal plate by etching or stamping.

With reference to FIG. 6, the conventional metal plate 91 comprises a substrate 92 of 42-alloy, a nickel layer 93 formed on the surface of the substrate 92 by plating with nickel and serving as a ground layer, and a solder layer 94 formed on the surface of the nickel layer 93 by plating with a solder (Pb—Sn alloy) for giving improved solderability to the lead frame to be formed. In the case of the conventional metal plate 91 for forming the lead frames 6, 60 of the solid electrolyte capacitor 1, the substrate 92 of 42-alloy is about 0.1 mm in thickness, the nickel layer 93 has a thickness of the order of 0.1 $\mu$m, and the solder layer 94 has a thickness of the order of 1 $\mu$m.

The metal plate 61 for use in the present embodiment comprises a substrate 62 of 42-alloy, and a copper layer 63 formed on the surface of the substrate 62 by plating with copper as seen in FIG. 5. The electric conductivity of the 42-alloy is about $1.5 \times 10^6$ S (siemens)/m at room temperature, whereas that of copper at room temperature is about $58 \times 10^6$ S/m and exceedingly higher than the former. Accordingly the copper layer 63 formed on the surface of the substrate 62 of 42-alloy serves as a highly conductive layer.

Preferably the lead frame is provided with a material for giving improved solderability. If this material is provided over the surface of the copper layer, however, the copper diffuses through the material to lower the conductivity. To preclude this, a nickel layer 64 serving as a ground layer is formed on the surface of the copper layer 63 by plating with nickel, and the surface of the nickel layer 64 is coated with the material for giving improved solderability. Examples of materials for imparting improved solderability are solders, gold, silver, palladium, etc. According to the present embodiment, the surface of the nickel layer 64 is plated with palladium to form a palladium layer 65, which is further coated with a gold layer 66 by gold plating.

In the case of the metal plate 61 of the present embodiment for preparing the lead frames 6, 60 of the solid electrolyte capacitor 1, the substrate 62 of 42-alloy is about 0.1 mm, the copper layer 63 is of the order of 1 $\mu$m, the nickel layer 64 and the palladium layer 65 are of the order of 0.1 $\mu$m, and the gold layer 66 is of the order of 0.01 $\mu$m in thickness. The metal plate 61 is comparable to the conventional metal plate 91 in thickness.

When solid electrolyte capacitors were prepared according to the present embodiment and checked for ESR, the average ESR value was 40.9 m$\Omega$. On the other hand, solid electrolyte capacitors were prepared under the same conditions as the present embodiment with the exception of using conventional lead frames and checked for ESR. The average ESR value was 50.0 m$\Omega$. These results indicate that capacitors of lower ESR can be produced according to the invention than in the prior art.

Lead frames according to the present embodiment and those of the prior art were further checked for solderability using a digital soldergraph manufactured by Tamura Corp. The measuring device is used for evaluating the solderability of a solder applied to the sample by measuring the force exerted by the solder on the sample with time.

Figure 7:
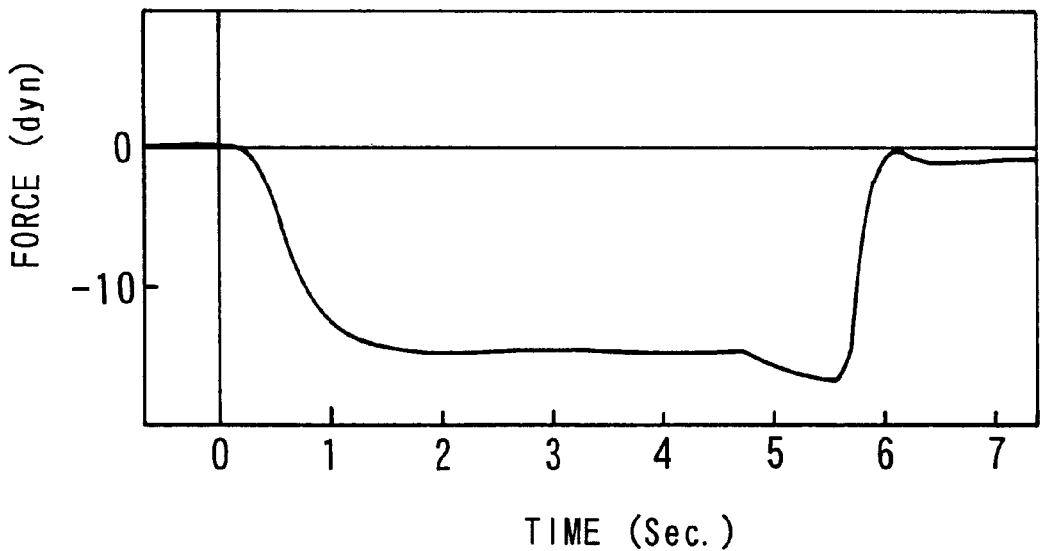
FIG. 7 is a graph showing the wettability of the metal plate of FIG. 5 with solder.
Figure 8:
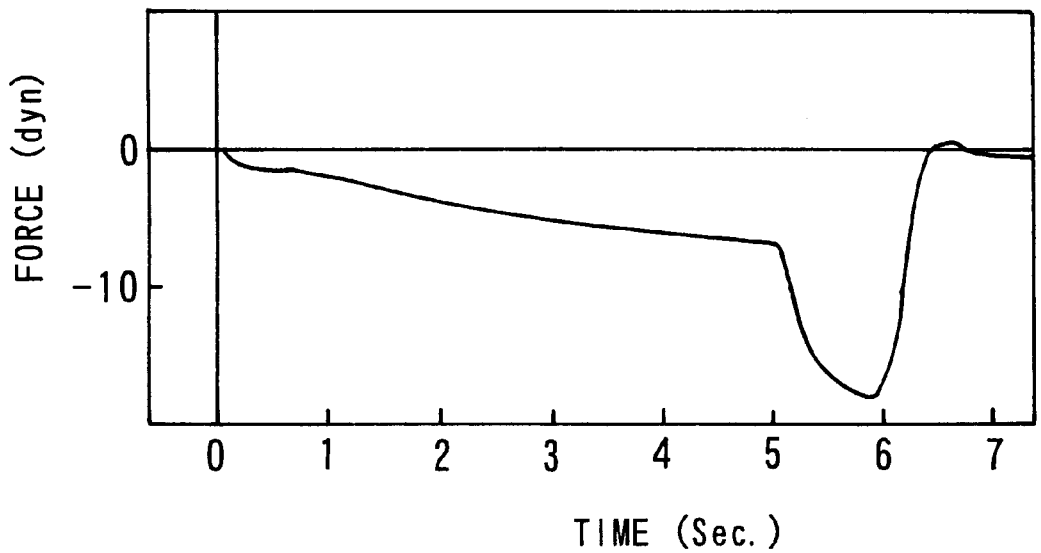
FIG. 8 is a graph showing the wettability of the metal plate of FIG. 6 with solder.

FIG. 7 is a graph showing the measurements obtained for the metal plate 61 useful for the lead frames of the present embodiment. FIG. 8 is a graph showing the measurements obtained for the metal plate 91 for the conventional lead frames. Plotted as abscissa is the time elapsed, and as ordinate is the force exerted by the solder on the sample. When the value of the ordinate is positive, the solder exerts a pressing force on the sample, whereas if the value is negative, the solder exerts a tensile force on the sample. The greater the negative value of the ordinate, the greater is the tensile force and the higher is the solderability.

FIGS. 7 and 8 reveal that the tensile force increases within a shorter period of time on the lead frame of the embodiment than on the conventional frame, hence higher solderability available by the embodiment.

In the conventional case wherein the solder (Pb—Sn alloy) layer 94 is formed to obtain improved solderability, the use of lead (Pb) has recently aroused concern about the influence thereof on the environment. Further the encapsulation of capacitor elements in a resin produces waste solder, which is responsible for the occurrence of rejects failing to meet the specified standard. According to the present embodiment, the palladium layer 65 and the gold layer 66 are formed in place of the solder layer 94 to afford improved solderability, so that the problems due to the provision of the solder layer 94 are avoidable.

In electric conductivity at room temperature, gold and palladium are about $46\times10^6$ S/m and about $10\times10^6$ S/m, respectively, and are higher than the 42-alloy, with the result that the palladium layer 65 and the gold layer 66 function as highly conductive layers along with the copper layer 63. This is especially true of the gold layer 66.

Although the 42-alloy is used as the base material for the conventional lead frame for giving improved conductivity, improved conductivity is afforded by the high conductive layer according to the invention. A material, such as iron, which has a suitable strength and is less costly than the 42-alloy is therefore usable as the base material to reduce the production cost.

The lead frame of the present embodiment has nearly the same thickness as the conventional frame and accordingly will not increase the size of the solid electrolyte capacitor 1.

The embodiments described above are intended to illustrate the present invention and should not be construed as restricting the invention set forth in the appended claims or reducing the scope thereof. The foregoing embodiments are not limitative in construction but can of course be modified variously within the technical scope of the claims.

For example, the high conductive layer is formed on the entire surface of each of the lead frames 6, 60 according to the present embodiment, whereas even if the high conductive layer is formed only locally on the surface of the lead frame, the lead frame can be diminished in electric resistance insofar as the high conductive layer extends from a connection 6a (60a) to the capacitor body 10 to a connection 6b (60b) for an external circuit (see FIG. 3).

What is claimed is:

1. A process for producing a solid electrolyte capacitor forming a dielectric oxide film on an anode body of valve metal, forming a cathode layer of solid conductive substance on the oxide film to prepare a capacitor element, coating the cathode layer of the capacitor element with a carbon layer, coating the carbon layer with a silver paste layer to prepare a capacitor body, and bonding a lead frame to the silver paste layer of the capacitor body with a silver adhesive, the process being characterized in that while the capacitor element coated with the carbon layer and a silver paste are being vibrated relative to each other, the capacitor element is dipped in the silver paste and withdrawn therefrom in the direction of the vibration, whereby the carbon layer is coated with the silver paste layer.

2. A process for producing a solid electrolyte capacitor according to claim 1 wherein the silver paste has a viscosity of 50 to 300 poises.

3. A process for producing a solid electrolyte capacitor according to claim 1 wherein the amplitude of the vibration is 0.2 to 2 times the length of the capacitor element in the direction of the vibration.

4. A process for producing a solid electrolyte capacitor according to claim 1 wherein the frequency of the vibration is 20 to 100 Hz.

5. A process for producing a solid electrolyte capacitor according to claim 1 wherein a surface of the lead frame is partly or entirely formed with a high conductive layer of a material having a higher electric conductivity than a substrate of the lead frame, the high conductive layer extending from a connection to the capacitor body to a connection for an external circuit.

* * * * *